US012608004B2

(12) United States Patent
Refaat

(10) Patent No.: US 12,608,004 B2
(45) Date of Patent: Apr. 21, 2026

(54) USING DISTRIBUTIONS FOR CHARACTERISTICS OF HYPOTHETICAL OCCLUDED OBJECTS FOR AUTONOMOUS VEHICLES

(71) Applicant: WAYMO LLC, Mountain View, CA (US)

(72) Inventor: Khaled Refaat, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 304 days.

(21) Appl. No.: 17/375,620

(22) Filed: Jul. 14, 2021

(65) Prior Publication Data

US 2023/0015880 A1 Jan. 19, 2023

(51) Int. Cl.
*B60W 60/00* (2020.01)
*G05D 1/00* (2006.01)
*G05D 1/02* (2020.01)

(52) U.S. Cl.
CPC ......... *G05D 1/0223* (2013.01); *B60W 60/001* (2020.02); *G05D 1/0287* (2013.01); *B60W 2520/06* (2013.01); *B60W 2520/10* (2013.01); *B60W 2520/105* (2013.01); *B60W 2520/12* (2013.01); *B60W 2520/125* (2013.01); *B60W 2554/4046* (2020.02); *B60W 2555/20* (2020.02); *B60W 2555/60* (2020.02); *B60W 2556/10* (2020.02)

(58) Field of Classification Search
CPC .............. G05D 1/0223; G05D 1/0287; B60W 2556/10; B60W 2555/20; B60W 2555/60; B60W 60/001; B60W 2554/4046; B60W 2520/06; B60W 2520/10; B60W 2520/105; B60W 2520/12; B60W 2520/125

See application file for complete search history.

(56) References Cited

U.S. PATENT DOCUMENTS

| | | | |
|---|---|---|---|
| 10,146,223 | B1 | 12/2018 | Luders et al. |
| 10,496,099 | B2 | 12/2019 | Wilkinson et al. |
| 10,926,777 | B2 | 2/2021 | Mcgill |
| 10,955,851 | B2 | 3/2021 | Ghafarianzadeh et al. |
| 2008/0046165 | A1* | 2/2008 | Downs ................. G08G 1/0104 701/117 |
| 2017/0004705 | A1* | 1/2017 | Fowe ................... G08G 1/0145 |
| 2019/0025843 | A1* | 1/2019 | Wilkinson ........... G05D 1/0088 |
| 2020/0012295 | A1* | 1/2020 | Kim ................... G06Q 10/0631 |
| 2020/0225669 | A1 | 7/2020 | Silva et al. |
| 2021/0061269 | A1* | 3/2021 | Petroff ................. B60W 40/04 |
| 2021/0078562 | A1* | 3/2021 | Frazzoli ............... B60W 40/04 |

* cited by examiner

*Primary Examiner* — Jess Whittington
*Assistant Examiner* — Rami Nabih Bedewi
(74) *Attorney, Agent, or Firm* — Botos Churchill IP Law

(57) ABSTRACT

Aspects of the disclosure provide for generating distributions for hypothetical or potentially occluded objects. For instance, a location for which to generate one or more distributions may be identified. Observations of road users by perception systems of a plurality of autonomous vehicles may be accessed. Each of these observations may identify a characteristic of one of the road users. A distribution of the characteristic for the location may be determined based on the observations. The distribution may be provided to one or more autonomous vehicles in order to enable the one or more autonomous vehicles to use the distribution to generate a characteristic for a hypothetical occluded road user and to respond to the hypothetical occluded road user.

22 Claims, 11 Drawing Sheets

1100

100

400

| 0-5 mph | 5-10 mph | 10-15 mph | 15-20 mph | 20-25 mph |
|---------|----------|-----------|-----------|-----------|

FIGURE 7

| 0-5 mph | 5-10 mph | 10-15 mph | 15-20 mph | 20-25 mph |
|---------|----------|-----------|-----------|-----------|
| 5% | 20% | 45% | 25% | 5% |

FIGURE 8

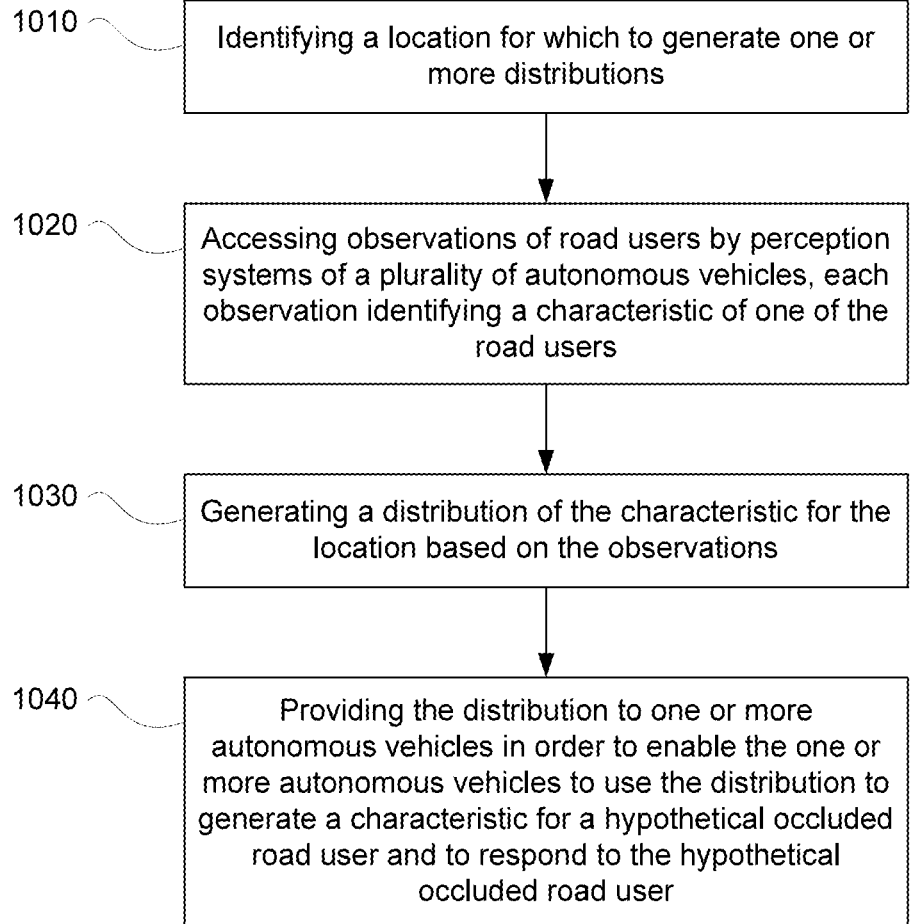

1010    Identifying a location for which to generate one or more distributions

1020    Accessing observations of road users by perception systems of a plurality of autonomous vehicles, each observation identifying a characteristic of one of the road users 1030    Generating a distribution of the characteristic for the location based on the observations 1040    Providing the distribution to one or more autonomous vehicles in order to enable the one or more autonomous vehicles to use the distribution to generate a characteristic for a hypothetical occluded road user and to respond to the hypothetical occluded road user

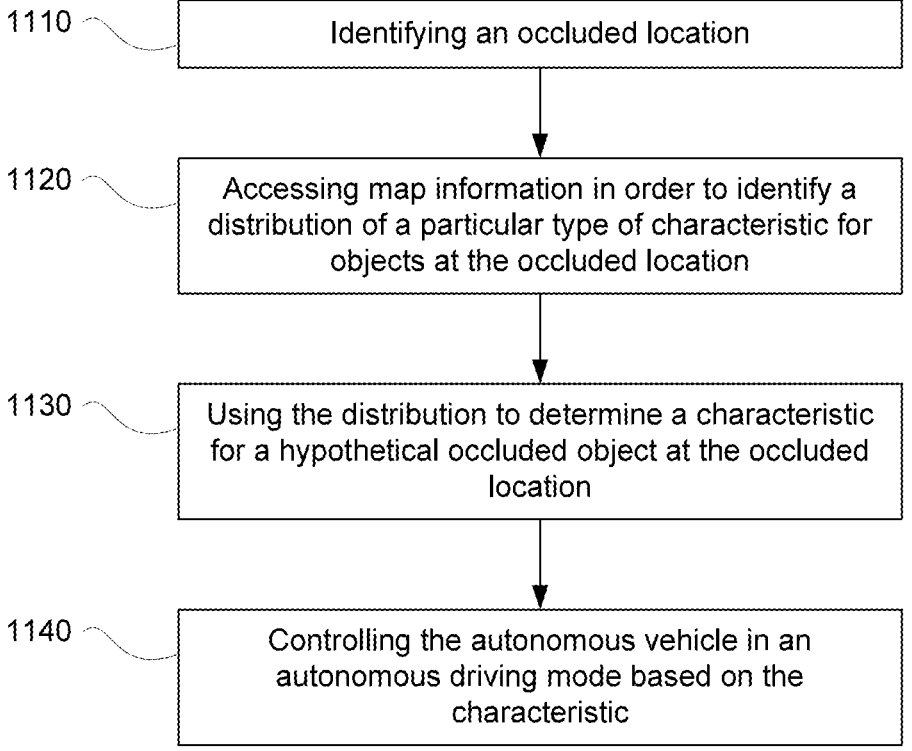

1110 — Identifying an occluded location

1120 — Accessing map information in order to identify a distribution of a particular type of characteristic for objects at the occluded location 1130 — Using the distribution to determine a characteristic for a hypothetical occluded object at the occluded location 1140 — Controlling the autonomous vehicle in an autonomous driving mode based on the characteristic

USING DISTRIBUTIONS FOR CHARACTERISTICS OF HYPOTHETICAL OCCLUDED OBJECTS FOR AUTONOMOUS VEHICLES

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Autonomous vehicles are equipped with various types of sensors in order to detect objects in the surroundings. For example, autonomous vehicles may include sonar, radar, camera, LIDAR, and other devices that scan and record data from the vehicle's surroundings.

BRIEF SUMMARY

Aspects of the disclosure provide a method of generating distributions for hypothetical or potentially occluded objects. The method includes identifying, by one or more processors of one or more server computing devices, a location for which to generate one or more distributions; accessing, by the one or more processors, observations of road users by perception systems of a plurality of autonomous vehicles, each observation identifying a characteristic of one of the road users; generating, by the one or more processors, a distribution of the characteristic for the location based on the observations; and providing, by the one or more processors, the distribution to one or more autonomous vehicles in order to enable the one or more autonomous vehicles to use the distribution to generate a characteristic for a hypothetical occluded road user and to respond to the hypothetical occluded road user.

In one example, determining the distribution includes arranging the characteristics of the road users into a plurality of bins. In this example, determining the distributions includes normalizing a number of observed characteristics within each of the plurality of bins. In addition or alternatively, determining the distributions includes normalizing a number of observed characteristics within each of the plurality of bins, each bin representing a different range of speeds. In another example, the characteristic is acceleration. In another, the characteristic is speed. In another example, the characteristic is heading.

In another example, each observation is associated with context information, and wherein determining the distribution is based on the context information. In this example, the context information includes a state of a traffic signal. In addition or alternatively, the context information includes a time of day. In addition or alternatively, the context information includes behavior of orthogonal traffic. In addition or alternatively, the context information includes a weather condition.

In another example, the location is identified by sampling uniformly from a lane of the location. In another example, the location is identified by accessing log data from autonomous vehicles and identifying where computing devices of those autonomous vehicles expected occluded objects to be located. In another example, the location is identified from information provided by a human operator. In another example, the location is identified by accessing log data from autonomous vehicles and identifying locations that are out of a field of view of a perception system of one of the autonomous vehicles.

Another aspect of the disclosure provides a method of controlling an autonomous vehicle. The method includes identifying, by one or more processors of one or more computing devices of the autonomous vehicle, an occluded location; accessing, by the one or more processors, map information in order to identify a distribution of a particular type of characteristic for objects at the occluded location; using, by the one or more processors, the distribution to determine a characteristic for a hypothetical occluded object at the occluded location; and controlling, by the one or more processors, the autonomous vehicle in an autonomous driving mode based on the characteristic.

In one example, identifying the distribution includes identifying a current context for a driving environment of the autonomous vehicle. In another example, identifying the distribution includes identifying a plurality of distributions from the map information and combining this plurality into the distribution. In another example, using the distribution to determine the characteristic includes determining an average value for the characteristic.

BRIEF DESCRIPTION OF THE DRAWINGS

FIG. 7 is an example representation of bins and ranges in accordance with aspects of the disclosure.

FIG. 8 is an example representation of a distribution in accordance with aspects of the disclosure.

FIG. 10 is an example flow diagram in accordance with aspects of the disclosure.

FIG. 11 is another example flow diagram in accordance with aspects of the disclosure.

DETAILED DESCRIPTION

Overview

Figure 1:
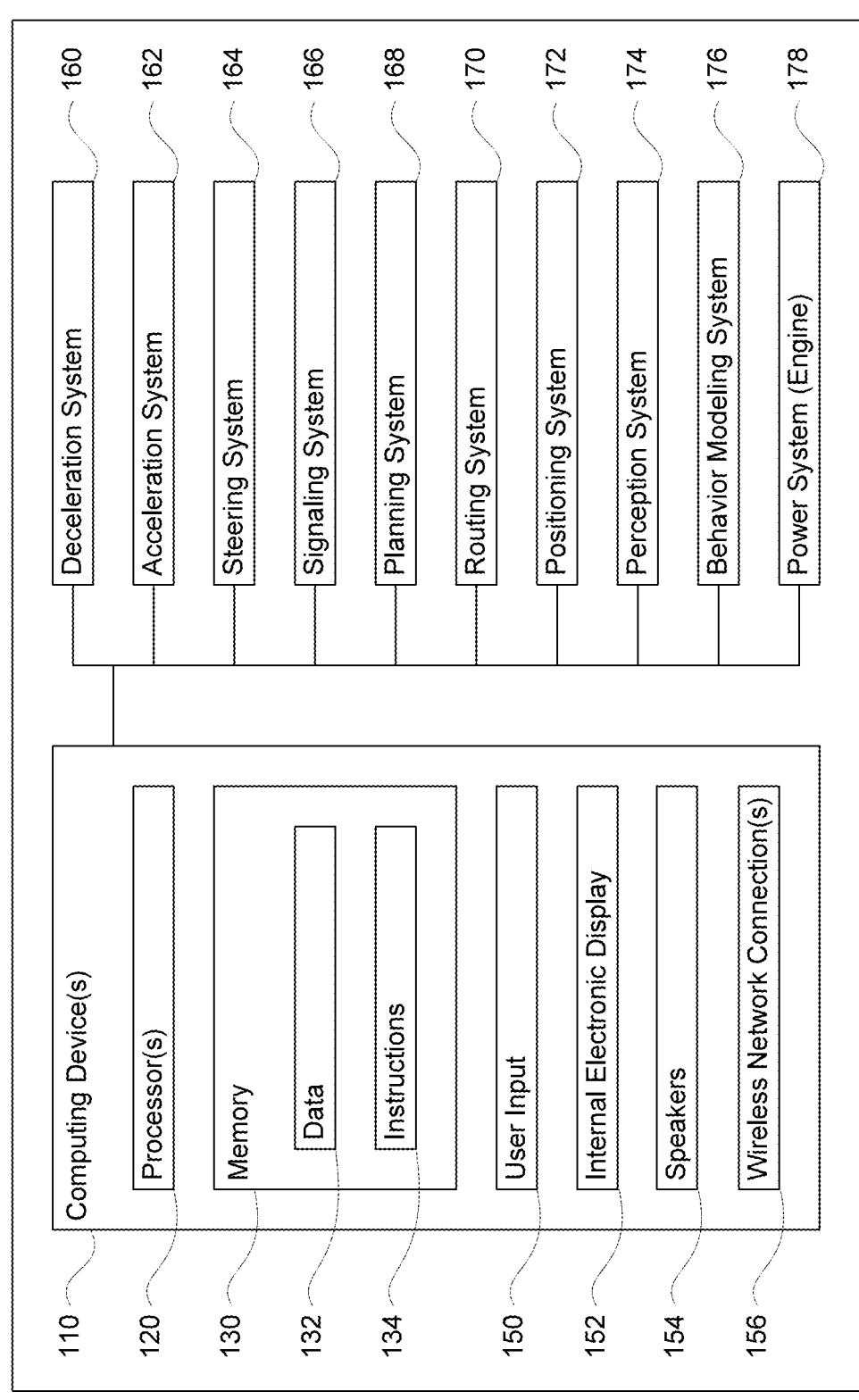
FIG. 1 is a functional diagram of an example vehicle in accordance with an exemplary embodiment.

The technology relates to utilizing historical information in order to allow autonomous vehicles to better reason about occluded objects. As an autonomous vehicle moves through its environment, some areas may not be fully perceived and therefore may be considered to be occluded. In some instances, an occluded object, including a road user such as a vehicle, cyclist or pedestrian, may appear from such occluded areas without warning. Thus, it is important for an autonomous vehicle to use such information to determine whether it is safe to drive, yield, wait, etc. For example, if there is an occluded road user that will cross an autonomous vehicle's trajectory, it might be safer for the autonomous vehicle to wait for the occluded road user to pass the autonomous vehicle's planned trajectory before proceeding. While the field of view of the sensors of an autonomous vehicle's perception system can be used to identify hypothetical or potentially occluded areas, knowing of such occluded areas may not be sufficient to drive safely. For instance, even if objects are expected to be located in such occluded areas, and an autonomous vehicle "creates" a hypothetical object as a placeholder for a hypothetical occluded road user, the speed, acceleration, and heading of such hypothetical occluded objects are completely unknown. Moreover, relying on speed limits of roads to "estimate" likely characteristics of objects may not always be the most useful approach.

To address this, a distribution of historical data for various motion quantities may be generated and used by autonomous vehicles to make driving decisions. The distributions may be generated using information collected by the aforementioned autonomous vehicles. For example, the perception systems of these autonomous vehicles may collect information about objects including their observed locations and characteristics. For a given location, a distribution of the observations of different objects at that given location may be collected and associated with that location. For example, for a plurality of speed intervals or bins, the distribution may be determined from a number of observations in each bin. These values may then be normalized in order to provide a distribution. Similar distributions may be generated for other characteristics such as acceleration, heading, etc.

Once the distributions are generated, they may be associated with their corresponding locations in map information. This map information may be provided or otherwise sent to the autonomous vehicles in order to enable the autonomous vehicles to use the distributions to make driving decisions. In this regard, updated or new distributions may be periodically sent to the autonomous vehicles, for instance via a network, and incorporated into a local version of the map information as they are received.

As indicated, the autonomous vehicles may use the distributions to make driving decisions. In order to do so, an autonomous vehicle's computing devices may identify an occluded location from which a road user may be expected to appear, for instance based on an intersection of an edge of a perceptive range of the vehicle's perception system with a lane of traffic which approaches a planned trajectory or route of the autonomous vehicle and/or using any other approach. In some instances, the vehicle's computing devices may also determine a current context for the autonomous vehicle's driving environment at the current point in time. This may include identifying traffic light states, time of day, orthogonal traffic behavior, etc.

The identified occluded location may be used to identify one or more distributions for the occluded location. For example, the autonomous vehicle's computing devices may access the map information to identify the one or more distributions.

The one or more identified distribution can be used to generate characteristics of a hypothetical occluded road user at the occluded location. In one example, the mean of each identified distribution may be used as the characteristics of the hypothetical occluded agent. These characteristics may be input into the behavior modeling system to predict a future behavior for the hypothetical occluded object. In some instances, rather than first determining discrete values for the characteristics, the one or more identified distributions may be input into the behavior modeling system or other machine learning model to predict a future behavior for the hypothetical occluded object.

The characteristics and the output of the behavior modeling system and other machine learning models can be input into various systems of the autonomous vehicle in order to make driving decisions. For example, this information may be input into the planner system in order to generate trajectories for the vehicle to follow. As a result, the autonomous vehicle may be able to drive more safely and respond to hypothetical or hypothetical or potentially occluded objects.

The features described herein may allow autonomous vehicles to better reason about occluded objects. For example, using the aforementioned distributions to determine characteristics of hypothetical occluded objects, may result in more realistic and reliable characteristics and therefore more realistic and reliable behavior predictions. This, in turn, may result in better, more appropriate and therefore potentially safer driving behaviors by an autonomous vehicle which allows that autonomous vehicle to be even more risk averse. In addition, having different distributions for different contexts and geographic areas allows autonomous vehicles to learn about and improve responses to hypothetical or potentially occluded objects in different situations without having to have actually observed objects in those locations. Moreover, this information can be shared and reused by a plurality of autonomous vehicles. In this regard, observations from different autonomous vehicles are effectively shared and used to improve the safety of other autonomous vehicles.

Example Systems

As shown in FIG. 1, an autonomous vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor 120. The memory 130 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more button, mouse, keyboard, touch screen and/or microphone), various electronic displays (e.g., a monitor having a screen or any other electrical device that is operable to display information), and speakers 154 to provide information to a passenger of the autonomous vehicle 100 or others as needed. For example, electronic display 152 may be located within a cabin of autonomous vehicle 100 and may be used by computing devices 110 to provide information to passengers within the autonomous vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may be part of an autonomous control system for the autonomous vehicle 100 and may be capable of communicating with various components of the vehicle in order to control the vehicle in an autonomous driving mode. For example, returning to FIG. 1, the computing devices 110 may be in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of autonomous vehicle 100 in accordance with the instructions 134 of memory 130 in the autonomous driving mode.

As an example, the computing devices 110 may interact with deceleration system 160 and acceleration system 162 in order to control the speed of the vehicle. Similarly, steering system 164 may be used by computing devices 110 in order to control the direction of autonomous vehicle 100. For example, if autonomous vehicle 100 is configured for use on a road, such as a car or truck, the steering system may include components to control the angle of wheels to turn the vehicle. The computing devices 110 may also use the signaling system 166 in order to signal the vehicle's intent to other drivers or vehicles, for example, by lighting turn signals or brake lights when needed.

Routing system 170 may be used by the computing devices 110 in order to generate a route to a destination using map information. Planning system 168 may be used by computing device 110 in order to generate short-term trajectories that allow the vehicle to follow routes generated by the routing system. In this regard, the planning system 168 and/or routing system 166 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device, as such as the computing devices 410 discussed below or other computing devices), pullover spots, vegetation, or other such objects and information.

Figure 2:
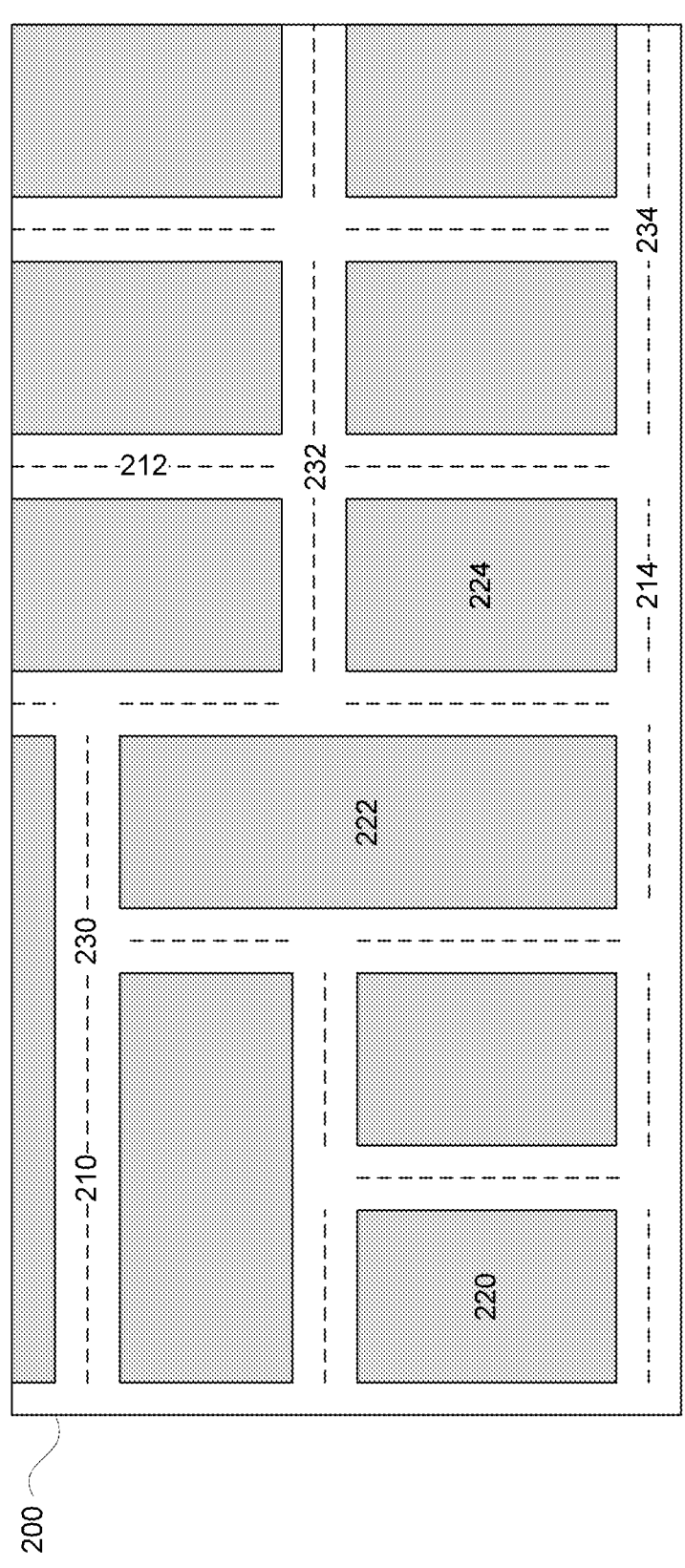
FIG. 2 is an example representation of map information in accordance with aspects of the disclosure.

FIG. 2 is an example of map information 200 for a section of roadway corresponding to a service area for autonomous vehicles such as autonomous vehicle 100. In this example, the map information 200 includes information identifying the shape, location, and other characteristics of lane lines represented by dashed-lines 210, 212, 214 designating roads or otherwise drivable areas, non-drivable areas (such as buildings, parks, etc.) represented by shaded areas 220, 222, 224, as well as intersections 230, 232, 234. Although only a few features are shown and identified, the map information 200 may be highly-detailed and include various additional features. Although only few features are depicted in the map information 200 of FIG. 2, however, the map information 200 may include significantly more features and details in order to enable the autonomous vehicle 100 to be controlled in the autonomous driving mode.

In addition to the aforementioned physical feature information, the map information may be configured as a roadgraph which includes a plurality of graph nodes and edges representing road or lane segments that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the autonomous vehicle 100 must be moving in in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 166 may use the aforementioned map information to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it which can often be determined with less noise that absolute geographical location.

The positioning system 172 may also include other devices in communication with the computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other vehicles, obstacles in the roadway, traffic signals, signs, trees, etc. For example, the perception system 174 may include LIDARs, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location.

Figure 3:
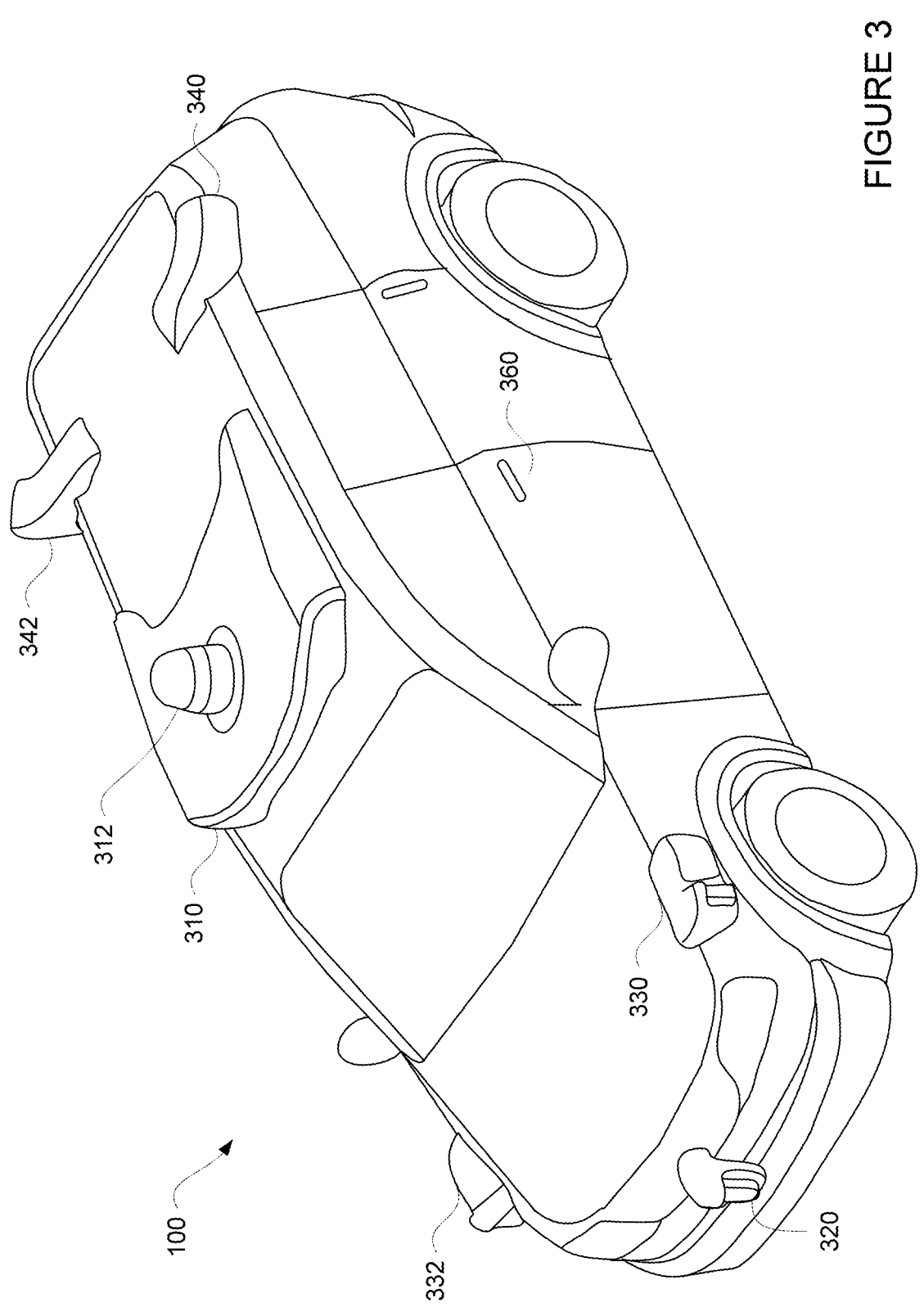
FIG. 3 is an example external view of a vehicle in accordance with aspects of the disclosure.

For instance, FIG. 3 is an example external view of autonomous vehicle 100. In this example, roof-top housing 310 and dome housing 312 may include a LIDAR sensor as well as various cameras and radar units. In addition, housing 320 located at the front end of autonomous vehicle 100 and housings 330, 332 on the driver's and passenger's sides of the vehicle may each store a LIDAR sensor. For example, housing 330 is located in front of driver door 360. Autonomous vehicle 100 also includes housings 340, 342 for radar units and/or cameras also located on the roof of autonomous vehicle 100. Additional radar units and cameras (not shown) may be located at the front and rear ends of autonomous vehicle 100 and/or on other positions along the roof or roof-top housing 310.

The computing devices 110 may be capable of communicating with various components of the vehicle in order to control the movement of autonomous vehicle 100 according to primary vehicle control code of memory of the computing devices 110. For example, returning to FIG. 1, the computing devices 110 may include various computing devices in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of autonomous vehicle 100 in accordance with the instructions 134 of memory 130.

The various systems of the vehicle may function using autonomous vehicle control software in order to determine how to and to control the vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module of the behavior modeling system 176 which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate trajectories for the vehicle to follow for some brief period of time into the future based on a route generated by a routing module of the routing system 170. In this regard, the trajectories may define the specific characteristics of acceleration, deceleration, speed, etc. to allow the vehicle to follow the route towards reaching a destination. A control system software module of the computing devices 110 may be configured to control movement of the vehicle, for instance by controlling braking, acceleration and steering of the vehicle, in order to follow a trajectory.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of autonomous vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
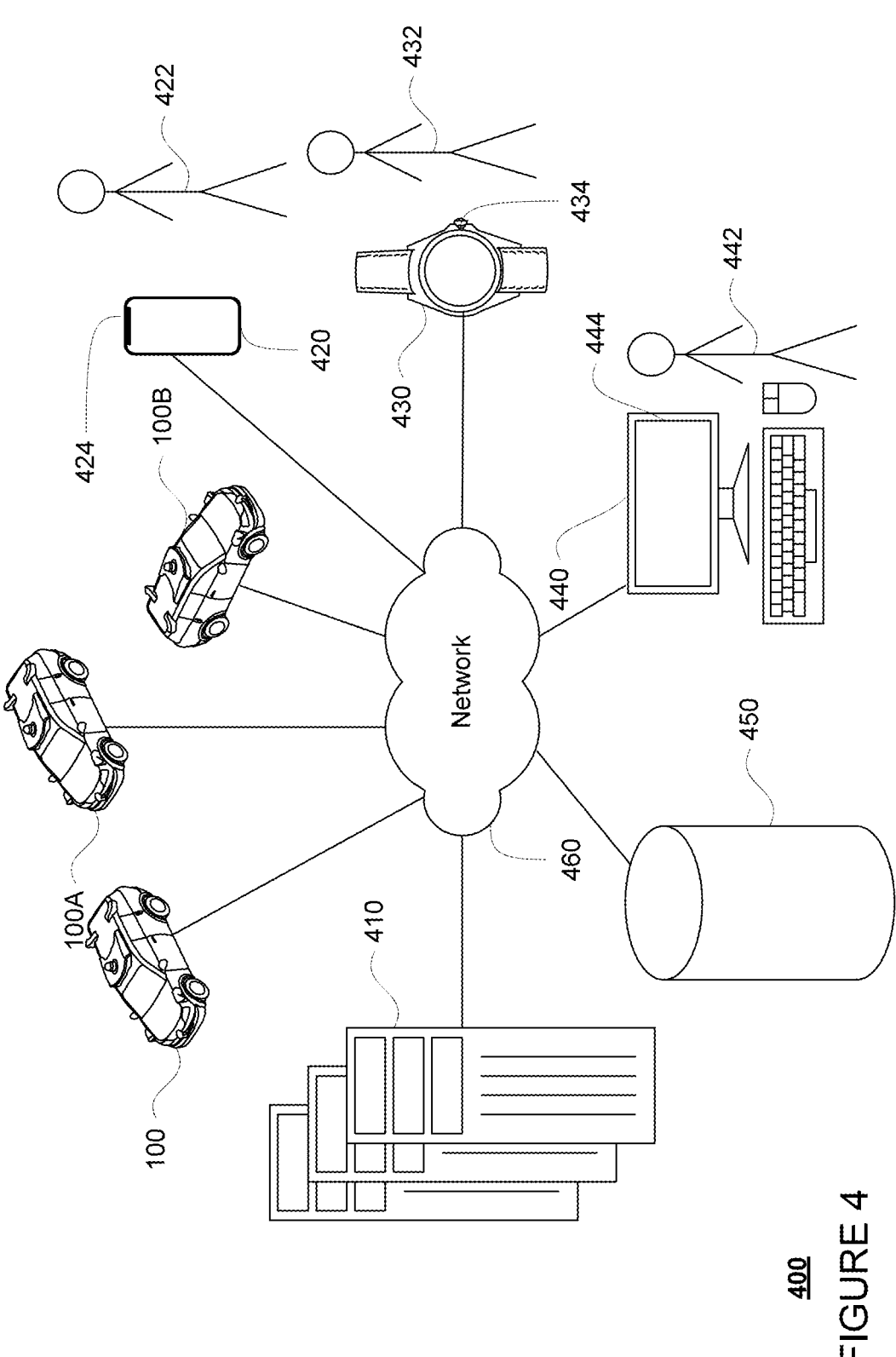
FIG. 4 is a pictorial diagram of an example system in accordance with aspects of the disclosure.
Figure 5:
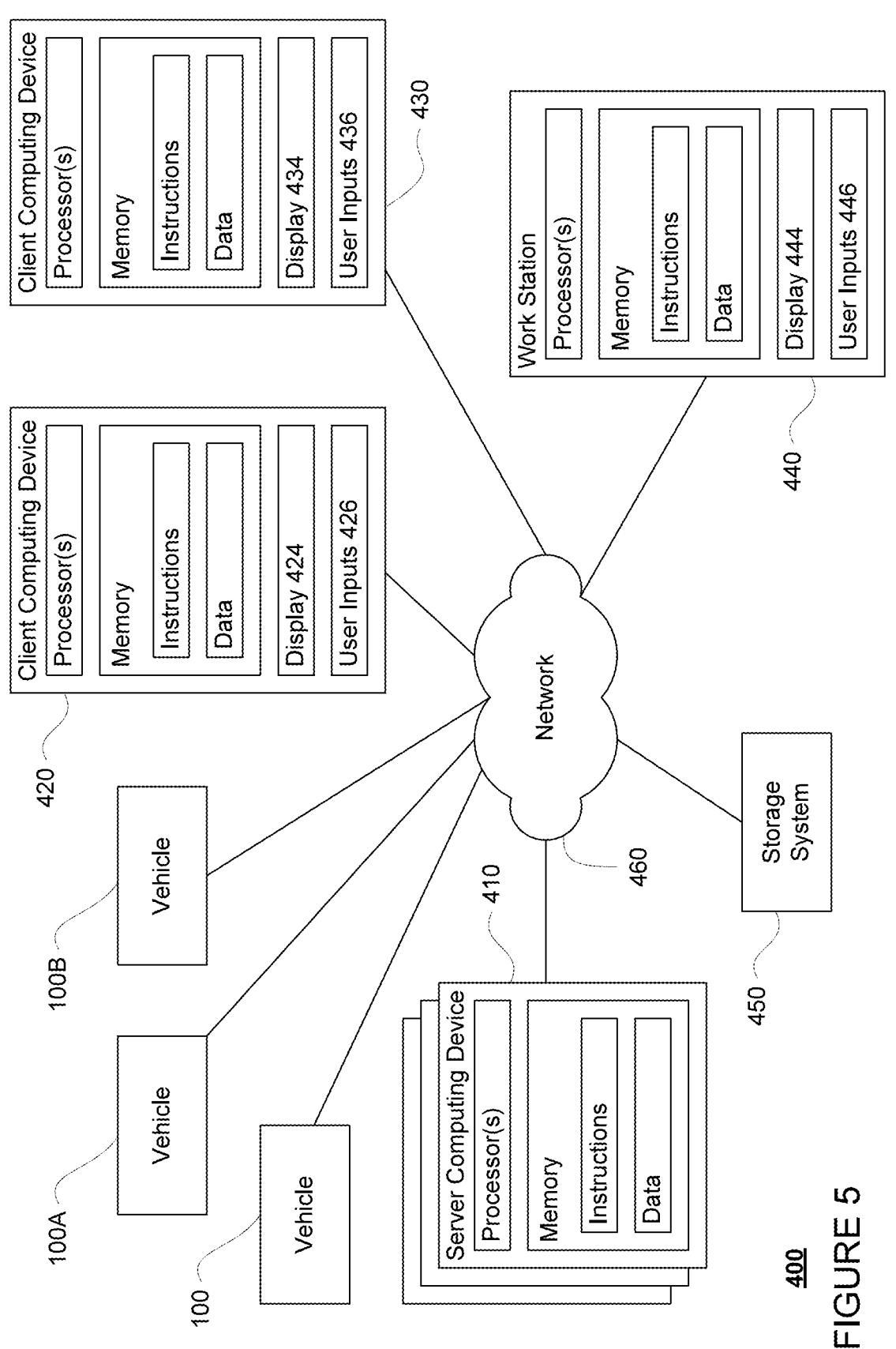
FIG. 5 is a functional diagram of the system of FIG. 4 in accordance with aspects of the disclosure.

Computing device 110 of autonomous vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes autonomous vehicle 100A and autonomous vehicle 100B, which may be configured the same as or similarly to autonomous vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of autonomous vehicle 100 or a similar computing device of autonomous vehicle 100A or autonomous vehicle 100B as well as computing devices 420, 430, 440 via the network 460. For example, autonomous vehicles 100, 100A, 100B, may be a part of a fleet of vehicles that can be dispatched by server computing devices to various locations. In this regard, the server computing devices 410 may function as a scheduling system which can be used to arrange trips for passengers by assigning and dispatching vehicles such as autonomous vehicles 100, 100A, 100B. These assignments may include scheduling trips to different locations in order to pick up and drop off those passengers. In this regard, the server computing devices 410 may operate using scheduling system software in order to manage the aforementioned autonomous vehicle scheduling and dispatching. In addition, the computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 3, each client computing device 420, 430 may be a personal computing device intended for use by a user 422, 432 and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 3. As an example the user may input information using a small keyboard, a keypad, microphone, using visual signals with a camera, or a touch screen. As yet another example, client computing device 440 may be a desktop computing system including a keyboard, mouse, camera and other input devices.

Each of the client computing devices may be a remote computing device used by a person (e.g. human operators or users 422, 432, 442) to review and analyze sensor data and other information generated by a perception system of a vehicle such as perception system 174 of autonomous vehicle 100. For example, user 442 may use the client computing device 440 to provide input to the simulation system 610 as discussed further below. Although only a few remote computing devices are shown in FIGS. 4 and 5, any number of such work stations may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 3 and 4, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. For example, the storage system 450 may also store a version of the aforementioned detailed map information (e.g. the map information 200) including all or some of the features discussed herein.

For instance, storage system 450 may store log data. This log data may include data generated by the various systems of a vehicle, such as autonomous vehicle 100, while the vehicle is being operated in a manual driving mode or an autonomous driving mode. For instance, the log data may include sensor data generated by a perception system, such as perception system 174 of autonomous vehicle 100. As an example, the sensor data may include raw sensor data as well as data identifying defining characteristics of perceived or observed objects such as shape, location, orientation, speed, etc. of objects such as vehicles, pedestrians, bicyclists, vegetation, curbs, lane lines, sidewalks, crosswalks, buildings, etc. Each time another road user object, such as a vehicle, bicyclist, pedestrian, etc. and that road user's characteristics are identified or labeled, this may be considered an "observation" of such road users.

The log data may also include "event" data identifying different types of events such as collisions or near collisions with other objects, planned trajectories describing a planned geometry and/or speed for a potential path of the vehicle, actual locations of the vehicle at different times, actual orientations/headings of the vehicle at different times, actual speeds, accelerations and decelerations of the vehicle at different times, classifications of and responses to perceived objects, behavior predictions of perceived objects, status of various systems (such as acceleration, deceleration, perception, steering, signaling, routing, planning, power, etc.) of the vehicle at different times including logged errors, inputs to and outputs of the various systems of the vehicle at different times, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

FIG. 10 is an example flow diagram 1000 for generating distributions for hypothetical occluded objects, which may be performed by one or more processors of one or more computing devices, such as the processors of the server computing devices 410 or the processors of any of the client computing devices 420, 430, 440. At block 1010, a location for which to generate one or more distributions is identified.

The locations for which the distributions are determined may be identified in different ways. In one example, the locations may be sampled uniformly from different lanes. In such examples, the number of samples may be determined by the cache storage available. In addition or alternatively, the locations may be determined by the server computing devices 410 by accessing the log data from the autonomous vehicles in storage system 450 in order to identify where the computing devices of such vehicles expect occluded objects to be located. In addition or alternatively, the locations may be determined by using human labelers to manually review map information and flag or otherwise identify the locations where occluded objects are likely to be located from different perspectives. In addition or alternatively, the locations may be identified heuristically, by looking for locations that are more likely to be occluded from different locations, such as those that are behind structures (e.g. buildings, monuments, etc.) or vegetation. In this approach, such locations may also be identified by reviewing log data to identify which locations are out of a field of view of an autonomous vehicle's perception system for the longest, for a minimum or for more than a maximum acceptable period of time.

Figure 6:
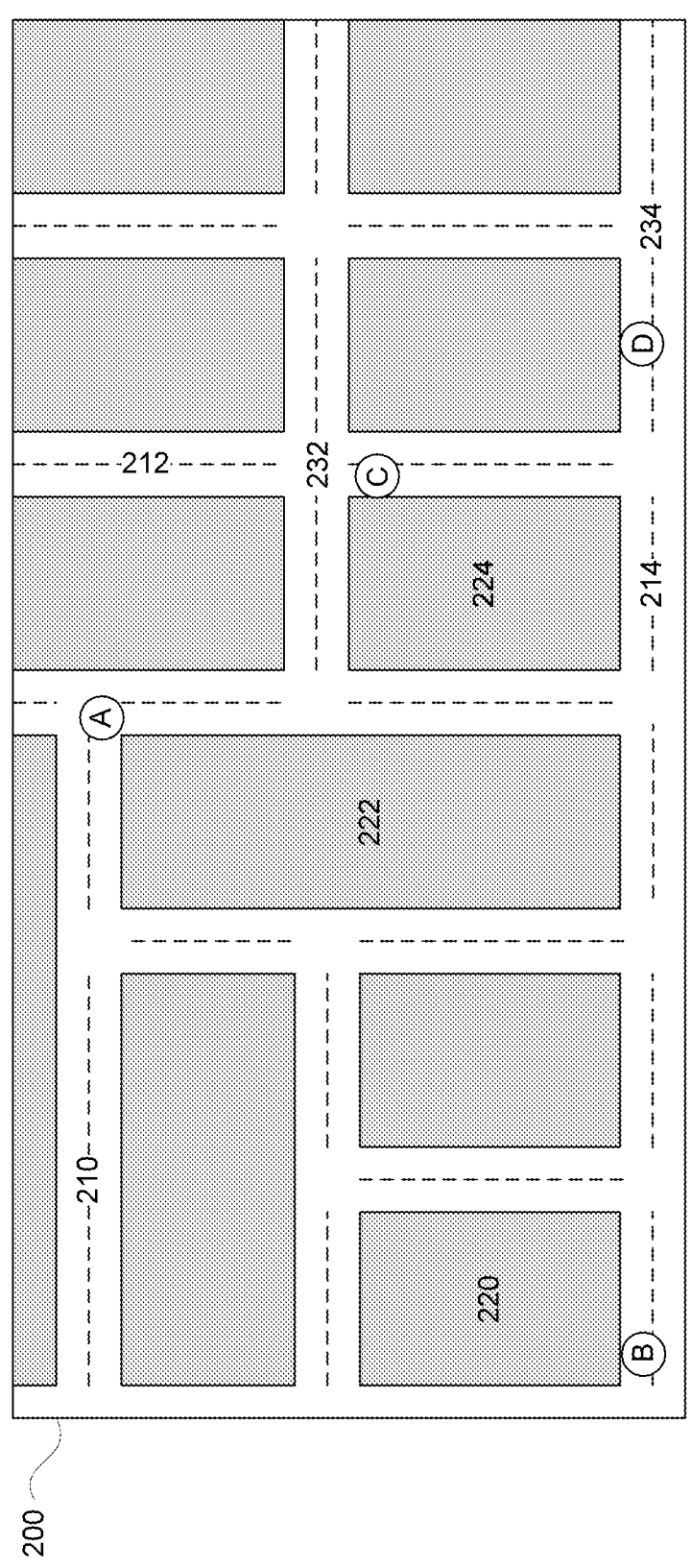
FIG. 6 is an example representation of map information and data in accordance with aspects of the disclosure.

For example, FIG. 6 is an example of the map information 200 with a plurality of locations A, B, C, D for which distributions may be determined. Each of these locations may be determined using any of the examples above. Although a location may be defined by a particular point (e.g. an x, y, z or other coordinate set), a location in this context may actually be an area or volume of space, such as a 2 m×2 m square area (or larger or smaller) or 2 m×2 m×2 m (or later or smaller) volume of space. This may be especially useful as there may not be many road users passing through the same exact (x,y) location, but any road user that does pass through (e.g. a center of the road user or any portion of the road user) a two-dimensional area or three-dimensional volume of space may contribute to the distribution for that area or volume of space.

Returning to FIG. 10, at block 1020, observations of road users by perception systems of a plurality of autonomous vehicles are accessed. Each of these observations identifies a characteristic of one of the road users. The distributions may be generated by the server computing devices 410 using the aforementioned observations collected by the aforementioned autonomous vehicles. For example, the perception systems of these autonomous vehicles may collect information about objects including their observed locations and characteristics (e.g. speed, acceleration, heading, etc.). This information may be uploaded (and subsequently downloaded) and saved in the storage system 450. For example, for each of the locations A, B, C, D of FIG. 6, the server computing devices 410 may retrieve any observations of road user objects from the storage system 450.

Returning to FIG. 10, at block 1030, a distribution of the characteristics for the location based on the observations is generated. For a given location, a distribution of the observations of different objects at that given location may be collected and associated with that location by the server computing devices 410. To do so, a plurality of bins with different ranges may be determined. For instance, for speed, the overall range may be determined from 0 mph (i.e. a static road user) to some maximum speed such as a speed limit plus some extra buffer for vehicles potentially violating speed limits. For example, for a road with a 55-mph speed limit, the overall range may be 0 mph to 80 mph. The ranges for each bin may be determined based off of the vehicle's planning system's sensitivity to various speeds or some other design requirements of the vehicle or server computing devices. For example, the range for each bin may be 5 mph or more or less. The number of bins may then be automatically determined by the range and the interval (e.g. through division). In this regard, for the 55-mph speed limit road example, the bins may range from 0 to 5 mph, 5 mph to 10 mph, 10 mph to 15 mph and so on up to 80 mph for a total of 16 bins.

Figure 7:
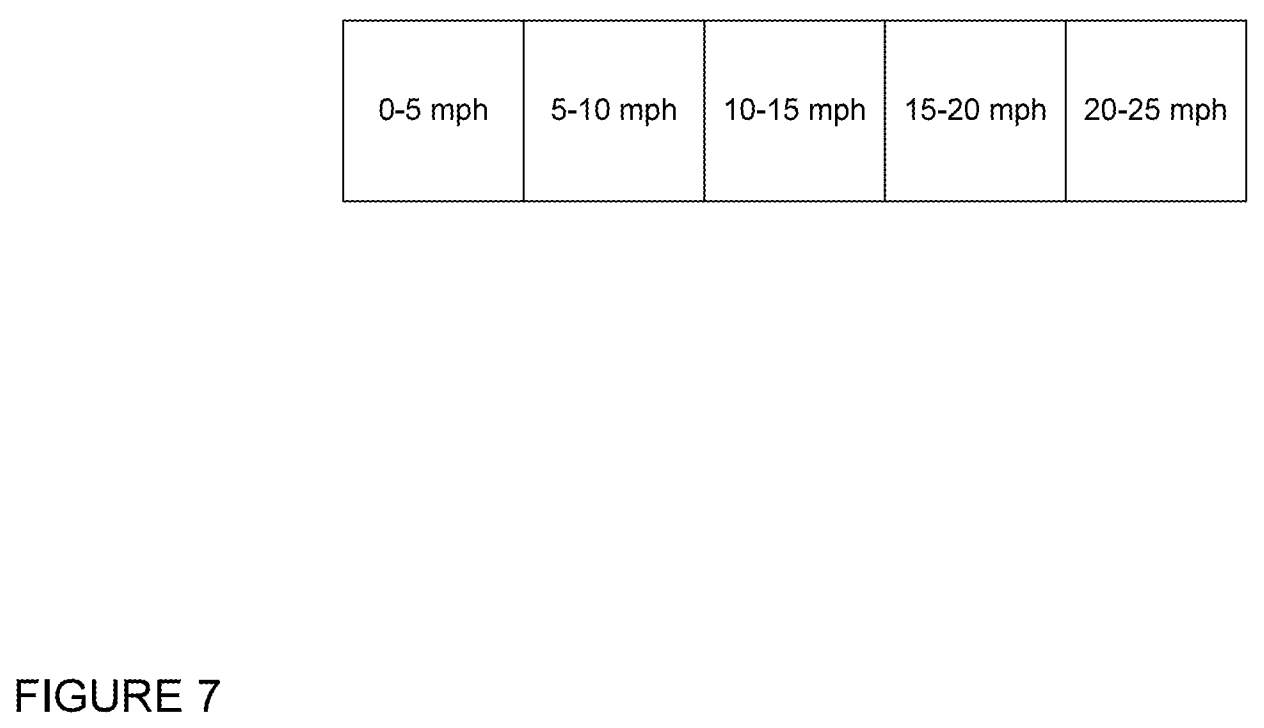

For example, turning to FIG. 7, a plurality of speed intervals or bins are represented. In this example, there are 5 bins: 0-5 mph, 5-10 mph, 10-15 mph, 15-20 mph, 20-25 mph. Significantly more or less bins as well as bins with larger or smaller ranges (e.g. 1, 2, 10, 15 mph ranges) may be used. Using such bins, distribution may be determined for a location, such as locations A, B, C, D, from a number of observations of road user objects observed at each of those locations (e.g. by the perception system 174 of autonomous vehicle 100, perception systems of other autonomous or nonautonomous vehicles, or other devices). The speed value for each observation may be sorted or assigned to a corresponding bin. The values in each bin may then be normalized (e.g. into percentages of the total number of observations for the given location) in order to provide a distribution for speed of a hypothetical or potentially occluded object. For instance, FIG. 8 represents an example normalized distribution of speed values for location A which identifies the percentages for each bin. Similar distributions may be generated for other characteristics such as acceleration, heading, etc.

In some instances, the observations may be further bucketized by different contexts. As an example, multiple distributions for different contexts, such as for different traffic light states, time of day and/or day of the week or year, orthogonal traffic behavior, weather conditions (e.g. whether it is raining or snowing), whether there are pedestrians or bicyclists present or exhibiting certain behaviors, etc. may be determined and stored for the same location.

Returning to FIG. 10, at block 1040, the distribution may be provided to one or more autonomous vehicles in order to enable the one or more autonomous vehicles to use the distribution to generate a characteristic for a hypothetical occluded road user and to respond to the hypothetical or potentially occluded road user. Once the distributions are generated, they may be associated with their corresponding locations in map information. For instance, the distribution of FIG. 8 may be appended to the map information 200 for example by being associated (via a pointer or other device) with the location A. This map information with one or more distributions may be provided or otherwise sent by the server computing devices 410, for instance via network 460, to the autonomous vehicles, such as autonomous vehicle 100, 100A, 100B in order to enable those autonomous vehicles to use the distributions to make driving decisions. In this regard, updated or new distributions may be periodically sent to the autonomous vehicles, for instance via a network, and incorporated into a local version of the map information as they are received.

FIG. 11 is an example flow diagram 1100 for controlling an autonomous vehicle, which may be performed by one or more processors of one or more computing devices, such as the processors 120 of the computing devices 110. At block 1110, an occluded location is identified. As indicated, the autonomous vehicles may use the distributions to make driving decisions. In order to do so, an autonomous vehicle's computing devices may identify an occluded location from which a road user may be expected to appear, for instance based on an intersection of an edge of a perceptive range of the perception system 174 with a lane of traffic which approaches a planned trajectory or route of the autonomous vehicle 100 and/or using any other approach. For example, the computing devices may expect a road user to appear in an orthogonal lane and where the perceptive range of the autonomous vehicle ends in that lane may be identified as an occluded location.

Figure 9:
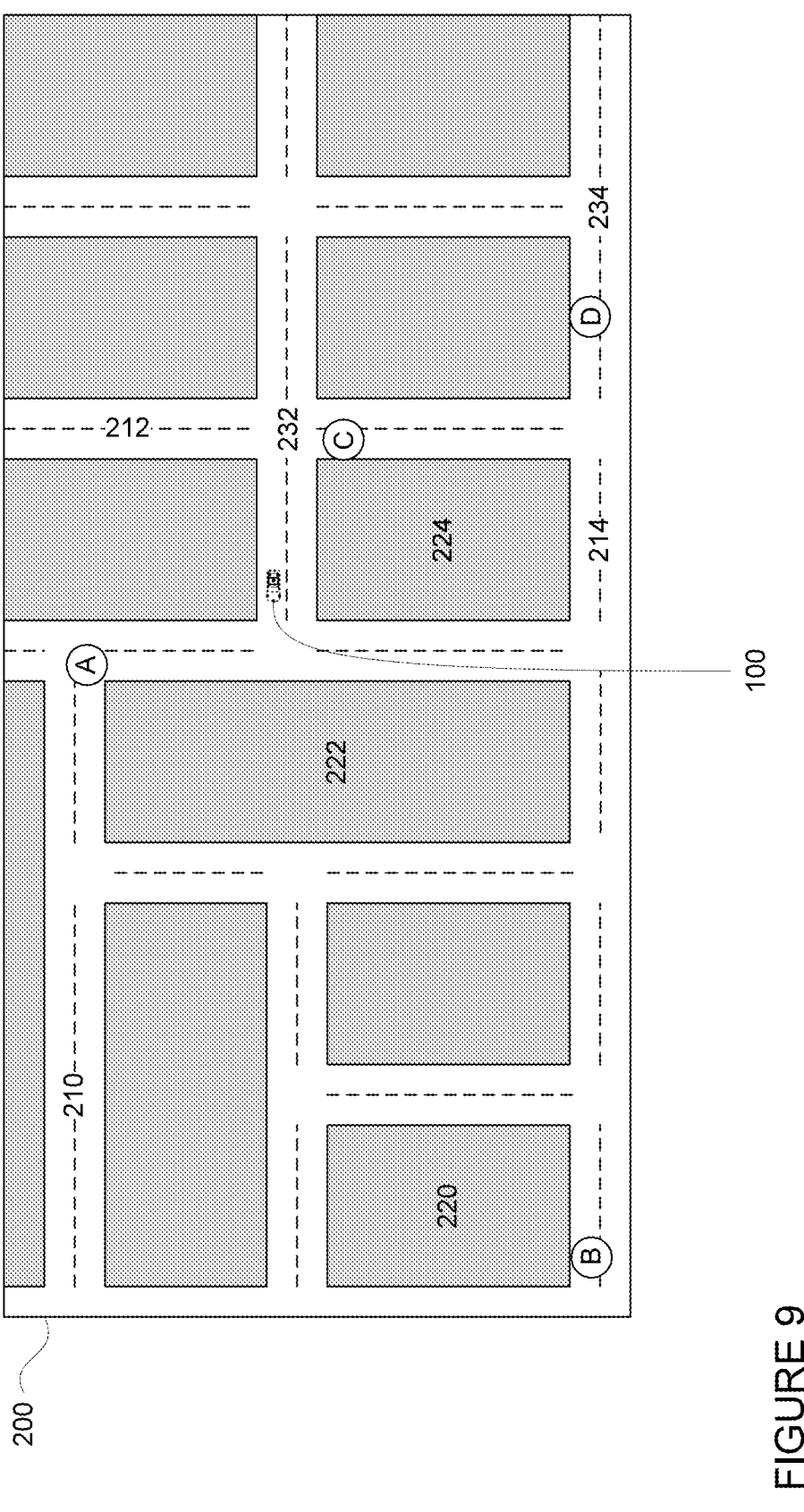
FIG. 9 is an example representation of map information, a vehicle and data in accordance with aspects of the disclosure.

Turning to the example of FIG. 9, the autonomous vehicle 100 is approaching location A. In this example, location A may be occluded by another object such as another road user, vegetation, buildings, etc. and therefore, at least at this point in time, not readably perceived by the perception system 174 of autonomous vehicle 100. As such, location A may be identified as an occluded location.

In some instances, the computing devices 110 may also determine a context for the autonomous vehicle's driving environment at the current point in time. This may include identifying traffic light states, time of day, orthogonal traffic behavior, etc. In some instances, this context or rather context information may be generated automatically by the vehicle's perception system for other purposes. For example, the perception system may generate a feature vector describing a current scene in which the autonomous vehicle is currently driving. This feature vector may be fed to various systems of the vehicle, including behavior modeling (e.g. in order to generate behavior predictions for other road users) as well as planning (e.g. in order to generate trajectories for the autonomous vehicle to follow).

Returning to FIG. 11, at block 1120, map information is accessed in order to identify a distribution of a particular type of characteristic for objects at the occluded location. The identified occluded location (and in some instances, context), may be used to identify one or more distributions (e.g. one for each of speed, acceleration, heading, etc.) for the occluded location. For example, the computing devices 110 may access the map information 200 stored locally at the autonomous vehicle 100 in order to identify one or more distributions for location A, such as the distribution represented in FIG. 8.

In some instances, there may not be any distribution for the exact location for the occluded location. In such cases, the computing devices 110 may identify the closest location with a distribution that has the same direction of travel as the occluded location. Alternatively, a k-nearest neighbors approach may be used where the distributions of the k nearest locations are averaged and then determining an overall average of the characteristic for the distributions or using the average distribution as input to a machine learning model described below. The "nearest" may be in terms of physical distance combined with other limitations. Such other limitations may include that the traffic flows of the nearest locations cannot be going in a different direction from the traffic flow of the occluded location and/or is limited to the same or the closest lane of traffic with the same direction of traffic flow as the occluded location.

Returning to FIG. 11, at block 1130, the distribution is used to determine a characteristic for a hypothetical occluded object at the occluded location. The one or more identified distribution can be used by the computing devices 110 to generate characteristics of a hypothetical or potentially occluded road user at the occluded location. In one example, the mean of each identified distribution (e.g. one for each of speed, acceleration, heading, etc.) may be used as the characteristics of the hypothetical or potentially occluded agent. For example, the mean of the distribution of FIG. 8 may be 12.75 mph. This is distinct from the mean of the speed values of all of the observations at location A, but may provide a reasonable expectation for the speed value of a hypothetical or potentially occluded object at location A. These generated characteristics may be input into the behavior modeling system to predict a future behavior for the hypothetical or potentially occluded object.

In some instances, rather than first determining discrete values for the characteristics, the one or more identified distributions (rather than a discrete value) may be input by the computing devices 110 into the behavior modeling system or other machine learning model to predict a (most likely) future behavior for the hypothetical occluded object. The model could be a deep neural network that predicts future trajectories and probabilities similarly to the behavior modeling system, but can accept one or both of distributions or discrete values (e.g. an average value), as input (e.g. via an input tensor or other vector). In this regard, the model may take the distributions an input (e.g. speed distribution) and output a single number (speed). This model could be trained to predict the correct speed of an occluded agent. For instance, the model could be a deep neural network that takes the distribution, map, traffic information, field of view, and autonomous vehicle info as input and is trained using a mean squared error loss. In some instances, additional ground truth speeds for occluded agents may be collected using either external sensors (e.g. installed on buildings) that have a larger/different field of view, or inferred from the perceived motion when the object appears from occlusion via extrapolation.

Alternatively, the one or more identified distributions can also be provided as input by the computing devices 110 to a motion estimation predictor that can generate more refined motion quantities. As another alternative, a neural network may be optimized to predict trajectories and probabilities, and only uses the distribution or average value as an input to help achieve its goal.

Another approach may be based on context and risk to the object and/or the autonomous vehicle 100. For example, if a pedestrian or other road user is occluded and the autonomous approaching the pedestrian or other road user, the autonomous vehicle's computing devices may assume the worst-case scenario (e.g. highest speed) to be extremely safe. If an occluded object is unlikely to interact with the autonomous vehicle, an average speed of the distribution or the output of the aforementioned model may be used. As such, the autonomous vehicle 100 may effectively be more risk-averse only in situations in which such behaviors are helpful.

Returning to FIG. 11, at block 1140, the autonomous vehicle is controlled in an autonomous driving mode based on the characteristic. The characteristics and the output of the behavior modeling system, other machine learning model, or motion estimation predictor can be input by the computing devices 110 into various systems of the autonomous vehicle in order to make driving decisions. For example, this information may be input into the planner system in order to generate trajectories for the vehicle to follow. As a result, the autonomous vehicle 100 may be able to drive more safely by potentially avoiding a collision or other interaction with an object that was at one time occluded.

In some instances, if there is a preference to be more risk-averse, the computing devices 110 may also consider the probability of the speed of potentially occluded road user being greater than a given speed according to the distribution. In this regard, if the probability is greater than some threshold, such as 0.2 or 20% or more or less, the planning system may automatically take some particular type of action in the next generated trajectory such as slowing the autonomous vehicle down. the planner may decide to slow down.

In addition to the different contexts described above, distributions may be generated and used as described herein for different types of objects. For instance, for each type of road user (e.g. vehicles, bicyclist, pedestrian, etc.), a separate distribution may be generated for each of the identified locations. This may be especially useful in certain situations. For example, bicyclists and pedestrians may typically move at different speeds (e.g. bicyclists tend to be faster than pedestrians). In this regard, when an autonomous vehicle identifies an occluded location, the computing devices 110 may retrieve distributions belonging to different types of road users at that location in order to plan a reaction for each type. As such, the autonomous vehicle may be able to respond to potentially occluded vehicles, bicyclists and pedestrians at the same location all at the same time. In addition, in some locations (e.g. a sidewalk for pedestrians) the computing devices 110 may only expect certain types of road users to be there, so the computing devices 110 may retrieve only the distribution for the certain type of road user at the occluded location. Which types of objects are expected to be located at different locations may also be stored in the map information.

The features described herein may allow autonomous vehicles to better reason about occluded objects. For example, using the aforementioned distributions to determine characteristics of hypothetical occluded objects, may result in more realistic and reliable characteristics and therefore more realistic and reliable behavior predictions. This, in turn, may result in better, more appropriate and therefore potentially safer driving behaviors by an autonomous vehicle which allows that autonomous vehicle to be even more risk averse. In addition, having different distributions for different contexts and geographic areas allows autonomous vehicles to learn about and improve responses to hypothetical or potentially occluded objects in different situations without having to have actually observed objects in those locations. Moreover, this information can be shared and reused by a plurality of autonomous vehicles. In this regard, observations from different autonomous vehicles are effectively shared and used to improve the safety of other autonomous vehicles.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
   accessing, by one or more processors of one or more server computing devices, observations of other road users at a particular geographic location, the observations i) being generated by a perception system of a first autonomous vehicle of a plurality of autonomous vehicles and ii) corresponding to a particular type of characteristic of the other road users;

generating, by the one or more processors for the particular geographic location based on the observations, a distribution of values associated with the particular type of characteristic; and providing, by the one or more processors, the distribution of values to a second autonomous vehicle of the plurality of autonomous vehicles, wherein the second autonomous vehicle is controlled in an autonomous driving mode to respond to a hypothetical occluded other road user at the particular geographic location using one or more values for the hypothetical occluded other road user that are based on the distribution of values.

2. The method of claim 1, wherein generating the distribution of values includes arranging the observations into a plurality of bins.

3. The method of claim 2, wherein generating the distribution of values includes, for each of the plurality of bins, normalizing the arranged observations.

4. The method of claim 2, wherein:

the particular type of characteristic is speed of the other road users, each of the plurality of bins representing a different range of speeds, and generating the distribution of values includes, for each of the plurality of bins, normalizing the arranged observations.

5. The method of claim 1, wherein the particular type of characteristic is speed of the other road users.

6. The method of claim 1, wherein the particular type of characteristic is acceleration of the other road users.

7. The method of claim 1, wherein the particular type of characteristic is heading of the other road users.

8. The method of claim 1, wherein:

the observations are associated with context information, and generating the distribution of values includes generating, by the one or more processors, the distribution of values based on the context information.

9. The method of claim 8, wherein the context information includes a state of a traffic signal at the particular geographic location.

10. The method of claim 8, wherein the context information includes a time of day at the particular geographic location.

11. The method of claim 8, wherein the context information includes behavior of orthogonal traffic at the particular geographic location.

12. The method of claim 8, wherein the context information includes a weather condition at the particular geographic location.

13. The method of claim 1, further comprising identifying, by the one or more processors, the particular geographic location by sampling uniformly from a lane of the particular geographic location.

14. The method of claim 1, further comprising identifying, by the one or more processors, the particular geographic location based on log data from the plurality of autonomous vehicles and expectations of computing devices of the second autonomous vehicle of occluded objects at the particular geographic location.

15. The method of claim 1, further comprising identifying, by the one or more processors, the particular geographic location based on information provided by a human operator.

16. The method of claim 1, further comprising:

identifying, by the one or more processors, the particular geographic location by accessing log data from the plurality of autonomous vehicles; and identifying, by the one or more processors, locations that are out of a field of view of a perception system of at least one autonomous vehicle of the plurality of autonomous vehicles.

17. The method of claim 1, wherein the other road users include at least one of a vehicle other than the plurality of autonomous vehicles, a bicyclist, or a pedestrian.

18. A method comprising:

accessing, by one or more processors of one or more computing devices of a first autonomous vehicle of a plurality of autonomous vehicles, map information corresponding to a particular geographic location, the map information being based on observations of other road users at the particular geographic location, the observations i) being generated by a perception system of a second autonomous vehicle of the plurality of autonomous vehicles and ii) corresponding to a particular type of characteristic of the other road users, and the particular geographic location being occluded;

identifying, by the one or more processors based on the map information corresponding to the particular geographic location, a distribution of values associated with the particular type of characteristic for objects at the particular geographic location;

determining, by the one or more processors based on the distribution, one or more values associated with the particular type of characteristic for a hypothetical occluded object other than the plurality of autonomous vehicles at the particular geographic location; and controlling, by the one or more processors, the first autonomous vehicle at the particular geographic location in an autonomous driving mode based on the one or more values associated with the particular type of characteristic.

19. The method of claim 18, wherein identifying the distribution of values includes identifying a current context for a driving environment of the first autonomous vehicle.

20. The method of claim 18, wherein identifying the distribution of values includes identifying a plurality of distributions of values associated with the particular type of characteristic based on the map information based on a driving environment of the first autonomous vehicle.

21. The method of claim 20, wherein identifying the distribution of values further includes combining the plurality of distributions of values into the distribution of values.

22. The method of claim 18, wherein the other road users include at least one of a vehicle other than the plurality of autonomous vehicles, a bicyclist, or a pedestrian.

* * * * *